United States Patent
Kwon et al.

(10) Patent No.: US 8,610,649 B2
(45) Date of Patent: Dec. 17, 2013

(54) DISPLAY APPARATUSES AND METHODS OF FABRICATING THE SAME

(75) Inventors: Jangyeon Kwon, Seongnam-si (KR); Sangyoon Lee, Seoul (KR); Myungkwan Ryu, Yongin-si (KR); Taesang Kim, Seoul (KR); Kyungbae Park, Seoul (KR); Byungwook Yoo, Yongin-si (KR); Kyungseok Son, Seoul (KR); Jisim Jung, Icheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 988 days.

(21) Appl. No.: 12/314,516

(22) Filed: Dec. 11, 2008

(65) Prior Publication Data
US 2009/0289877 A1 Nov. 26, 2009

(30) Foreign Application Priority Data
May 22, 2008 (KR) .................. 10-2008-0047743

(51) Int. Cl.
G09G 3/32 (2006.01)
G09G 3/36 (2006.01)

(52) U.S. Cl.
USPC .............................................. 345/82; 345/87

(58) Field of Classification Search
USPC ............... 345/82, 87, 1.3, 55; 348/39, 33, 46, 348/455, 460; 445/24; 216/95, 97; 349/158
See application file for complete search history.

(56) References Cited

U.S. PATENT DOCUMENTS

| | | | |
|---|---|---|---|
| 2006/0204675 A1* | 9/2006 | Gao et al. | 428/1.1 |
| 2006/0278333 A1* | 12/2006 | Lee et al. | 156/263 |
| 2008/0018631 A1* | 1/2008 | Hioki et al. | 345/206 |
| 2008/0055831 A1* | 3/2008 | Satoh | 361/681 |
| 2008/0218369 A1* | 9/2008 | Krans et al. | 340/691.1 |
| 2009/0219225 A1* | 9/2009 | Cope | 345/55 |

FOREIGN PATENT DOCUMENTS

| | | |
|---|---|---|
| JP | 2000-122039 A | 4/2000 |
| KR | 10-2003-0071439 | 9/2003 |
| KR | 10-2006-0123597 | 12/2006 |

OTHER PUBLICATIONS

Japanese Office Action mailed on Jan. 18, 2013, and English-language translation of the Japanese Office Action.

* cited by examiner

*Primary Examiner* — Hong Zhou
(74) *Attorney, Agent, or Firm* — Harness, Dickey & Pierce P.L.C.

(57) ABSTRACT

A display apparatus may include: a flexible base having a first surface and a second surface; a hard base including a plurality of base members adhered onto the first surface of the flexible base; and/or an image display structure formed on the second surface of the flexible base. A method of manufacturing a display apparatus may include: preparing a flexible base having a first surface and a second surface; adhering a hard base onto the first surface of the flexible base; forming an image display structure on the second surface of the flexible base; and/or dividing the hard base into a plurality of base members.

32 Claims, 3 Drawing Sheets

DISPLAY APPARATUSES AND METHODS OF FABRICATING THE SAME

PRIORITY STATEMENT

This application claims priority from Korean Patent Application No. 10-2008-0047743, filed on May 22, 2008, in the Korean Intellectual Property Office (KIPO), the entire contents of which are incorporated herein by reference.

BACKGROUND

1. Field

Example embodiments relate to display apparatuses and/or methods of manufacturing the same. Also, example embodiments relate to display apparatuses that may improve reality and/or immersiveness, and/or methods of manufacturing the display apparatuses.

2. Description of Related Art

One characteristic of large-size displays may be to improve a field of view (FOV), thereby increasing immersiveness of viewers. When the FOV is increased, the viewer may be immersed more and more in images displayed on a display screen.

Traditionally, in order to increase the FOV, the size of a screen may be enlarged. Since there may be limitations in enlarging the size of a screen, a curved display that may realize a large FOV from a screen having a limited size may be used. The curved display may realize an FOV of about 30-35 degrees from a display having a size of about 50-60 inches. However, in order to improve the reality and/or immersiveness to a degree so that it is difficult to distinguish reality from the image, an FOV of about 65 degrees is required. An ultra-large display having a size of 105 inches, that is in development status, may have an FOV of only about 54 degrees.

A tiled display, that may combine a plurality of displays, may realize the FOV of 65 degrees or greater. As an example, Screen Technology, Co., Ltd. (Great Britain), has suggested an ultra-large display of 200 inches or larger by bonding a plurality of liquid crystal displays (LCDs) of 17 inches, wherein the ultra-large display may have an FOV of about 90 degrees. The above display may be manufactured by seaming a plurality of unit panels, each of which may be fabricated independently. However, it may be difficult to seam the unit panels and/or image quality degradation may occur on seamed portions between the panels.

SUMMARY

Example embodiments may provide display apparatuses having high FOV with a single panel structure, and/or methods of manufacturing the display apparatuses.

Example embodiments also may provide display apparatuses having a variable FOV within a range (that may or may not be predetermined), and/or methods of manufacturing the display apparatuses.

Example embodiments also may provide display apparatuses of high FOV, that may be easily manufactured and/or may have high image quality, and/or methods of manufacturing the display apparatuses.

According to example embodiments, a display apparatus may include: a flexible base having a first surface and a second surface; a hard base including a plurality of base members adhered onto the first surface of the flexible base; and/or an image display structure formed on the second surface of the flexible base.

According to example embodiments, a method of manufacturing a display apparatus may include: preparing a flexible base having a first surface and a second surface; adhering a hard base onto the first surface of the flexible base; forming an image display structure on the second surface of the flexible base; and/or dividing the hard base into a plurality of base members.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Figure 1:
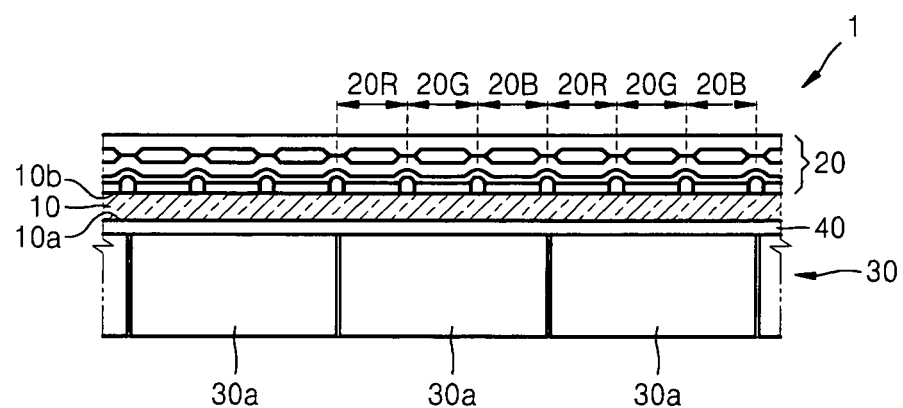
FIG. 1 is a partial cross-sectional view of a display apparatus according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a partial cross-sectional view of a display apparatus according to example embodiments. Referring to FIG. 1, display apparatus 1 of example embodiments may include flexible base 10 and/or hard base 30, including plurality of base members 30a that may be adhered to flexible base 10. Plurality of base members 30a may be fixed on first surface 10a of flexible base 10 in parallel with each other, and/or image display structure 20 may be formed on second surface 10b of flexible base 10.

Flexible base 10 may support image display structure 20, and/or hard base 30 may include plurality of base members 30a that may be fixed on flexible base 10 to flexibly support flexible base 10 and/or image display structure 20 formed on flexible base 10.

Figure 2:
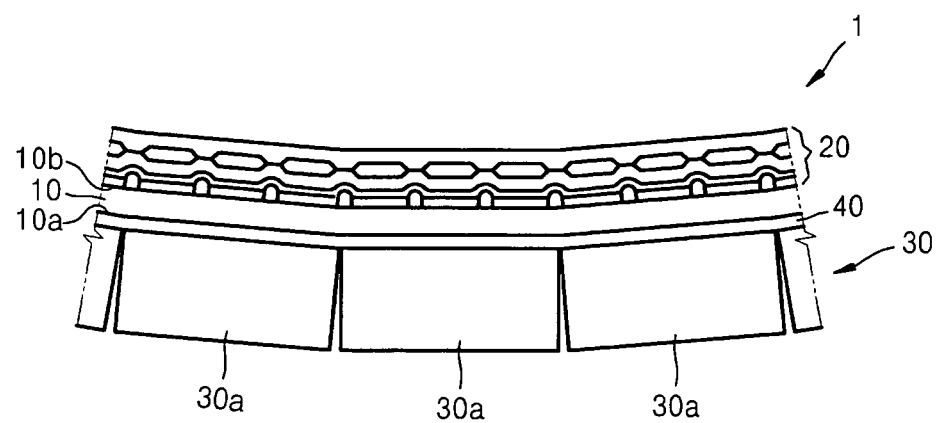
FIG. 2 is a cross-sectional view of the display apparatus of FIG. 1 in a bent status.

FIG. 2 is a cross-sectional view of the display apparatus of FIG. 1 in a bent status. As shown in FIG. 2, flexible base 10 may be bent (e.g., curved) toward image display structure 20 so that image display structure 20 may be transformed and/or returned to an unbent (e.g., flat) status. Therefore, image display structure 20 may be curved toward a viewer selectively by a user and, thus, reality and/or immersiveness may increase due to the increase in FOV. On the other hand, when there is no need to increase the FOV, image display structure 20 may be returned to the unbent status, as shown in FIG. 1. The transformation of image display structure 20 may be supported by hard base 30.

Hard base 30 may include plurality of base members 30a. Plurality of base members 30a may be obtained by cutting a hard plate material. Each of base members 30a may have, for example, a width corresponding to a width of three pixels (red (R), green (G), and blue (B)) 20R, 20G, and 20B in image display structure 20, as shown in FIG. 1. In the drawings, reference numeral 20R may denote a red pixel region, 20G may denote a green pixel region, and/or 20B may denote a blue pixel region.

According to example embodiments, the width of base member 30a may vary depending on design conditions of the display apparatus. The width of base member 30a may correspond to the width of the three unit pixels as shown in FIG. 1. In addition or in the alternative, the width of base member 30a may correspond to about ⅓ of the entire screen. In addition or in the alternative, the width of base member 30a may correspond to one of tens or hundreds of regions in the entire screen. The above structure depends on the design of the display apparatus. In FIG. 1, for example, an organic light emitting diode (OLED) may be used as image display structure 20. Such OLEDs are known to one of ordinary skill in the art.

Image display structure 20 may be a general display structure formed on flexible base 10, for example, the OLED or a liquid crystal display (LCD). Otherwise, image display structure 20 may be a reflective display, such as an electro-phoretic display (EPD) and/or an electro-chromic display (ECD). According to example embodiments, image display structure 20 may include one of the above examples of displays. However, image display structure 20 may have a structure combining displays selected from the above examples. For example, image display structure 20 may be a combined display, in which the LCD and the OLED display are integrated in a structure, a combined display combining the OLED display and the reflective display, etc.

The OLED display may have various shapes of diodes, that may include, for example, an organic light emitting layer and/or a cathode and/or an anode on one or both sides of the organic light emitting layer. When the OLED display is a full-color display, the OLED display may include R, G, and/or B pixels of diode structures, and/or one or more or each of the pixels may include a driving circuit. The driving circuits may include, for example, a driving transistor and/or a switching transistor, as is known to one of ordinary skill in the art.

The LCD may have a general structure, in which electrodes are formed on both sides of a liquid crystal layer. An active matrix LCD may include, for example, a driving transistor. A full-color LCD may include, for example, a color filter in one or more or each of the R, G, and/or B pixels.

The display apparatus according to example embodiments may include various types of image displaying structures, and is not limited to a certain image display structure. Therefore, image display structure formed on flexible base 10 of example embodiments may include an OLED display or LCD. Any kind of display structure that may be transformed, may be used as the image display structure.

According to example embodiments, image display structure 20 may be formed on flexible base 10. Therefore, image display structure 20 may be electrically and/or physically integrated and/or may be formed by a series of successive processes. A size of image display structure 20 may be limited by a size of flexible base 10. The size of image display structure 20 may be, for example, a few inches to a few hundred inches or more. According to example embodiments, the FOV of 150 inch-level may be obtained from a display having a size of 125 inches. In addition, the FOV of 200 inch-level may be obtained from a display having a size of 150 inches.

Figure 3:
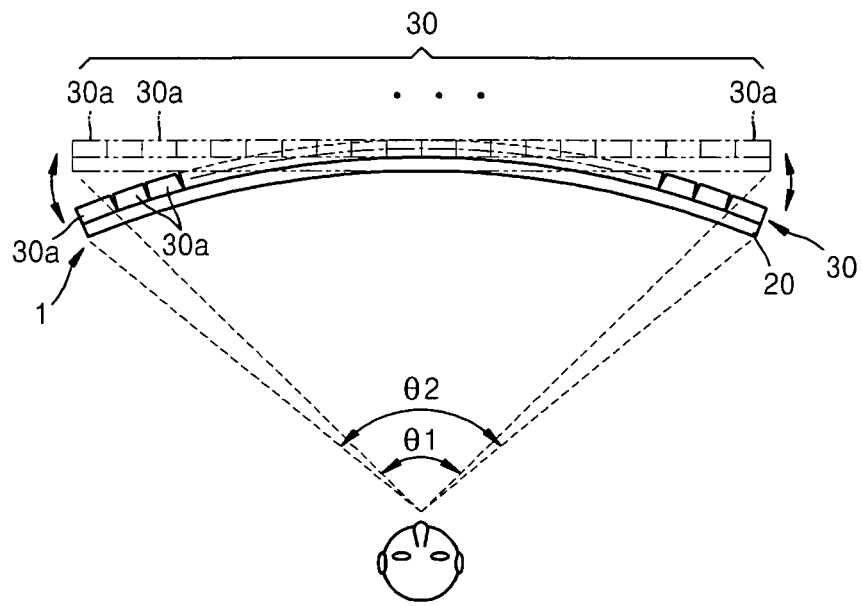
FIG. 3 is a diagram illustrating usage of the display apparatus according to example embodiments.

FIG. 3 is a diagram illustrating usage of the display apparatus according to example embodiments. In FIG. 3, the virtual line segments may denote an unbent (e.g., flat) status of image display structure 20, and/or the solid line segments may denote a bent (e.g., curved) status of the image display structure 20. The FOV of image display structure 20 in the unbent status may be $\theta 1$, and/or the FOV of image display structure 20 in the bent status may be $\theta 2$. When the user uses the display apparatus of example embodiments, the user may appropriately transform image display structure 20 supported by flexible base 10 so that the FOV may be increased and/or a display appearing larger than the actual size of the display apparatus may be provided.

According to the display apparatus of example embodiments, image display structure 20 may be formed on flexible base 10 by a single process as described above and, thus, an ultra-large display apparatus having the FOV of 200 inch-level, that has no seam caused by connecting a plurality of display panels, may be provided by sufficiently increasing the size of flexible base 10. The seamless screen of 200 inch-level may provide viewers with a deep sense of realism and/or immersiveness. The display apparatus having the above seamless image display structure according to example embodiments may be supported by an additional mechanical apparatus or apparatuses. The mechanical apparatus or apparatuses may adjust the bent degree of the display apparatus and/or may protect the entire structure of the display apparatus while maintaining the adjusted status of the display apparatus.

Hereinafter, a method of manufacturing the display apparatus according to example embodiments will be described as follows.

Figure 4:
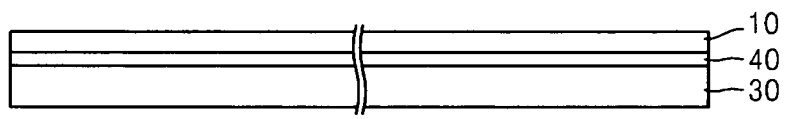
FIGS. 4 through 6 are diagrams illustrating processes of manufacturing a display apparatus according to example embodiments.
Figure 5:
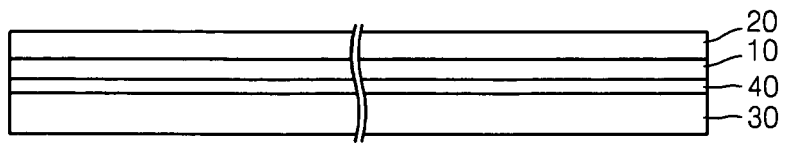
Figure 6:
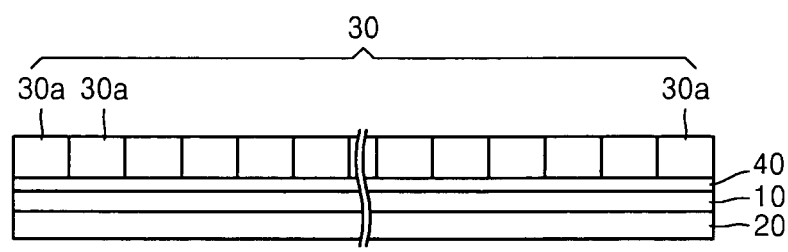

FIGS. 4 through 6 are diagrams illustrating processes of manufacturing a display apparatus according to example embodiments. As shown in FIG. 4, flexible base 10 may be fixed on hard base 30. At this time, adhesive layer 40 may be disposed between flexible base 10 and hard base 30. Hard base 30 may be a glass substrate and/or flexible base 10 may be a plastic substrate.

Adhesive layer 40 (or adhesive) may have characteristics that are different from those of adhesives typically used in manufacturing general flexible displays. Conventional adhesives used in manufacturing the flexible displays should prevent glass, that is used only in the manufacturing processes of the display, from separating away from a flexible substrate that supports the display. Moreover, conventional adhesives should be easily separated after finishing the display manufacturing processes. However, adhesive layer 40 used in example embodiments may remain a component of the display apparatus after finishing the manufacturing process of the display apparatus. Therefore, the adhesive layer used in the display apparatus of example embodiments may require excellent and stable adhesive properties.

As shown in FIG. 5, image display structure 20 may be formed on flexible base 10 using processes known to one of ordinary skill in the art. Image display structure 20 may be fabricated using its own fabricating processes. According to example embodiments, image display structure 20 may include an OLED display and/or an LCD. The OLED display may include a cathode, an anode, an organic light emitting layer, an electron transport layer, and/or a hole-transport layer. The LCD may include a color filter in one or more or each pixel, liquid crystal pixels, and/or one or more driving circuits. The display apparatus of example embodiments may include flexible base 10 formed of a material that is weak in the presence of heat, for example, plastic. Therefore, image display structure 20 may be fabricated according to low-temperature fabrication processes.

Referring to FIG. 6, after forming image display structure 20 on flexible base 10, hard base 30 may be cut to form the plurality of base members 30a. The cutting process is only performed with respect to hard base 30 and, thus, base members 30a of hard base 30 may maintain their fixed status on flexible base 10 due to adhesive layer 40. Hard base 30 may be cut, for example, using a scribing method and/or a laser cutting method that is generally used in semiconductor fabrication processes.

Figure 7:
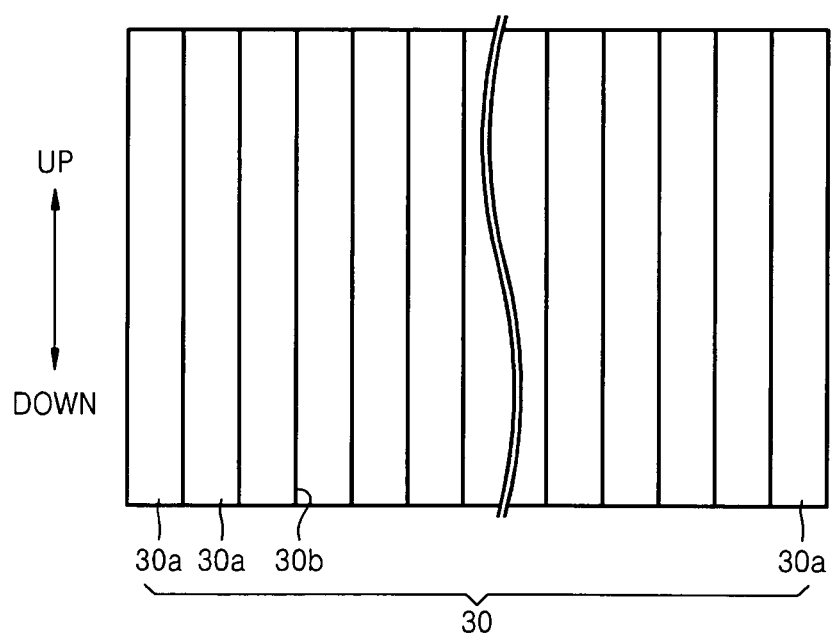
FIG. 7 is an exemplary diagram showing a cutting status of a hard base in the display apparatus according to example embodiments.

FIG. 7 is an exemplary diagram showing a cutting status of a hard base in the display apparatus according to example embodiments. FIG. 7 shows cut hard base 30, and a plurality of cutting lines 30b may be formed in a vertical direction of the drawing to form plurality of base members 30a in, for example, stripes and/or band shapes. Therefore, hard base 30 may include base members 30a that are parallel to each other.

According to the display apparatus of example embodiments, a seamless display of ultra-large size may be provided. Therefore, the display apparatus having an ultra-large size screen of excellent image quality may be obtained. The display apparatus of example embodiments may be applied to a small-size display apparatus, as well as an ultra-large display apparatus.

In the display apparatus of example embodiments, the curved status of the flexible base that is supported by the hard base members may be adjusted by the user and, thus, the user may adjust the FOV. For example, when the user watches the display apparatus alone, the flexible base may be sufficiently bent so that a maximum FOV may be obtained. When a lot of people watch the display apparatus together, the flexible base may be adjusted to be unbent. In addition, according to the display apparatus of example embodiments, a foldable display may be realized. That is, the flexible base may be supported by the plurality of base members on the foldable portion and, thus, a foldable display having no seamed portion may be fabricated.

While example embodiments have been particularly shown and described, it will be understood by those of ordinary skill in the art that various changes in form and details may be made therein without departing from the spirit and scope of the present invention as defined by the following claims.

What is claimed is:

1. A seamless display apparatus, comprising:
a flexible base having a first surface and a second surface;
an adhesive layer on the first surface of the flexible base;
a hard base on the adhesive layer, the hard base having a third surface adhered to the adhesive layer and a fourth surface on a side of the hard base opposite of the third surface, a plurality of cutting lines from the fourth surface to the third surface being formed in the hard base, the plurality of cutting lines dividing the hard base into a plurality of base members; and
an image display structure formed on the second surface of the flexible base;
wherein the display apparatus is configured to be adjustable between:
a first configuration in which the flexible base is flat; and
a second configuration in which ends of the flexible base are moved toward a viewer on an image-display-structure side of the flexible base.

2. The display apparatus of claim 1, wherein the image display structure includes a liquid crystal display (LCD).

3. The display apparatus of claim 1, wherein the image display structure includes an organic light emitting diode (OLED) display.

4. The display apparatus of claim 1, wherein the image display structure includes a reflective display.

5. The display apparatus of claim 1, wherein the flexible base is formed of plastic material.

6. The display apparatus of claim 5, wherein the hard base is formed of glass material.

7. The display apparatus of claim 6, wherein the display apparatus is in the first configuration, the plurality of base members are arranged in parallel with each other.

8. The display apparatus of claim 5, wherein the display apparatus is in the first configuration, the plurality of base members are arranged in parallel with each other.

9. The display apparatus of claim 1, wherein the hard base is formed of glass material.

10. The display apparatus of claim 9, wherein the display apparatus is in the first configuration, the plurality of base members are arranged in parallel with each other.

11. The display apparatus of claim 1, wherein the display apparatus is in the first configuration, the plurality of base members are arranged in parallel with each other.

12. The display apparatus of claim 1, wherein the display apparatus is configured to be adjustable between:
   the first configuration in which the image display structure is flat; and
   the second configuration in which the image display structure is bent with a constant curvature.

13. The display apparatus of claim 1, wherein the display apparatus is configured to be adjustable between:
   the first configuration in which the image display structure is flat; and
   the second configuration in which the image display structure is bent so that an angle between any two successive base members of the plurality of base members is constant.

14. The display apparatus of claim 1, wherein the display apparatus is configured to be adjustable between:
   the first configuration in which the plurality of base members are parallel to each other with respect to a vertical direction of the display apparatus; and
   the second configuration in which the image display structure is bent so that an angle between any two successive base members of the plurality of base members in the vertical direction of the display apparatus is constant.

15. A method of manufacturing a display apparatus, the method comprising:
   preparing a flexible base having a first surface and a second surface;
   forming an adhesive layer on the first surface of the flexible base;
   adhering a hard base onto the first surface of the flexible base, the hard base having a third surface adhered to the adhesive layer and a fourth surface on a side of the hard base opposite of the third surface;
   forming an image display structure on the second surface of the flexible base; and
   cutting the adhered hard base so that a plurality of cutting lines from the fourth surface to the third surface are formed, the plurality of cutting lines dividing the hard base into a plurality of base members.

16. The method of claim 15, wherein forming an image display structure includes forming a liquid crystal display (LCD).

17. The method of claim 15, wherein forming an image display structure includes forming an organic light emitting diode (OLED) display.

18. The method of claim 15, wherein cutting the adhered hard base includes forming the base members parallel to each other.

19. The method of claim 18, wherein the flexible base is formed of plastic material.

20. The method of claim 18, wherein the hard base is formed of glass material.

21. The method of claim 15, wherein the flexible base is formed of plastic material.

22. The method of claim 15, wherein the hard base is formed of glass material.

23. The method of claim 15, wherein the flexible base is formed of plastic material, and
   wherein the hard base is formed of glass material.

24. The method of claim 15, wherein cutting the adhered hard base comprises cutting the adhered hard base using scribing techniques.

25. The method of claim 15, wherein cutting the adhered hard base comprises cutting the adhered hard base using laser-cutting techniques.

26. A display apparatus, comprising:
   a flexible base having a first surface and a second surface;
   an adhesive layer on the first surface of the flexible base;
   a hard base on the adhesive layer, the hard base having a third surface adhered to the adhesive layer and a fourth surface on a side of the hard base opposite of the third surface, a plurality of cutting lines from the fourth surface to the third surface being formed in the hard base, the plurality of cutting lines dividing the hard base into a plurality of base members; and
   a seamless image display structure formed on the second surface of the flexible base;
   wherein the display apparatus is configured to be adjustable between:
      a first configuration in which the flexible base is flat; and
      a second configuration in which ends of the flexible base are moved toward a viewer on an image-display-structure side of the flexible base.

27. The display apparatus of claim 26, wherein the flexible base is formed of plastic material.

28. The display apparatus of claim 26, wherein the hard base is formed of glass material.

29. The display apparatus of claim 26, wherein the flexible base is formed of plastic material, and
   wherein the hard base is formed of glass material.

30. The display apparatus of claim 26, wherein when the display apparatus is in the second configuration, the image display structure is bent with a constant curvature.

31. The display apparatus of claim 26, wherein when the display apparatus is in the second configuration, the image display structure is bent so that an angle between any two successive base members of the plurality of base members is constant.

32. The display apparatus of claim 26, wherein when the display apparatus is in the second configuration, the image display structure is bent so that an angle between any two successive base members of the plurality of base members in the vertical direction of the display apparatus is constant.

* * * * *